United States Patent
Pietraszak et al.

(10) Patent No.: US 6,904,609 B1
(45) Date of Patent: Jun. 7, 2005

(54) SYSTEMS AND METHODS FOR ELECTRONIC PROGRAM GUIDE DATA SERVICES

(75) Inventors: Michael E. Pietraszak, Redmond, WA (US); Robert M. Fries, Redmond, WA (US); Robert S. T. Gibson, Monroe, WA (US); Jonathan A. Wray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/527,313

(22) Filed: Mar. 16, 2000

Related U.S. Application Data

(60) Provisional application No. 60/125,062, filed on Mar. 18, 1999.

(51) Int. Cl.⁷ ........................... H04N 5/455; G06F 3/00; G06F 13/00
(52) U.S. Cl. .............................. 725/39; 725/47; 725/49
(58) Field of Search .............................. 725/37, 45, 46, 725/47, 48, 49, 50, 59

(56) References Cited

U.S. PATENT DOCUMENTS

| | | | |
|---|---|---|---|
| 5,550,576 A | | 8/1996 | Klosterman ..................... 348/6 |
| 5,635,989 A | | 6/1997 | Rothmuller ................... 348/563 |
| 5,684,525 A | | 11/1997 | Klosterman .................. 348/12 |
| 5,880,768 A | * | 3/1999 | Lemmons et al. ............. 725/41 |
| 5,883,677 A | | 3/1999 | Hofmann ...................... 548/384 |
| 6,075,570 A | * | 6/2000 | Usui et al. ..................... 725/49 |
| 6,133,910 A | * | 10/2000 | Stinebruner ................... 725/49 |
| 6,157,411 A | * | 12/2000 | Williams et al. ............. 348/552 |
| 6,246,442 B1 | * | 6/2001 | Harada et al. ............... 348/569 |
| 6,442,756 B1 | * | 8/2002 | Durden et al. ................ 725/50 |
| 6,577,350 B1 | * | 6/2003 | Proehl et al. ................ 348/564 |

FOREIGN PATENT DOCUMENTS

| | | | |
|---|---|---|---|
| EP | 0 751 655 | 2/1997 | ....................... 29/6 |
| WO | 97 48228 | 12/1997 | .................... 5/445 |

* cited by examiner

*Primary Examiner*—John Miller
*Assistant Examiner*—James Sheleheda
(74) *Attorney, Agent, or Firm*—Workman Nydegger

(57) ABSTRACT

EPG services are provided, which enables a device such as a computer, a set top box or the like to collect EPG data from multiple EPG data providers or sources. The EPG data is collected at the device by EPG loaders. Each EPG loader collects EPG data from a particular source. The EPG loaders deliver the EPG data to a writer module, which performs scaling and formatting functions to the EPG data The writer module also stores the scaled and formatted EPG data in a database or other storage. Once stored, applications gain access to the EPG data through a control module. The writer module may also be implemented by chaining EPG loaders in a priority scheme. However, EPG loader interaction reduces independence and forces more rigid interface and implementation constraints upon the design of EPG loaders. The control module provides the accessed EPG data to the applications. EPG services function to isolate the operation of the applications from the EPG data sources. Because the EPG data is stored by the writer module and accessed by the control module, the applications and EPG data sources can change independently of one another without having an effect on the ability of EPG services to collect and provide access to EPG data.

12 Claims, 3 Drawing Sheets

SYSTEMS AND METHODS FOR ELECTRONIC PROGRAM GUIDE DATA SERVICES

RELATED APPLICATIONS

This application claims the benefit of U.S. Provisional Application Ser. No. 60/125,062, filed Mar. 18, 1999, and entitled "Filtering, Scaling, and Loading of Electronic Guide Data," which is incorporated herein by reference.

BACKGROUND OF THE INVENTION

1. The Field of the Invention

The present invention relates to electronic program guides. More specifically, the present invention relates to receiving electronic program guide data from multiple sources, to temporal filtering of the Electronic program guide data, and to extensible scalability of electronic program guide data.

2. The Prior State of the Art

Electronic program guides (EPGs) are designed to permit television viewers as well as Internet webcast viewers to browse and select from television listings which are displayed on a television screen. Before being displayed, the EPG data is downloaded from an EPG source such as a head end or a server to a destination device such as a television, computer or set top box. The EPG source, which may receive EPG data from a number of different EPG data providers, usually consolidates and encrypts the EPG data before transmitting it to the destination device. In conventional systems, the destination device is capable of receiving EPG data from only one EPG data source, which indicates that the destination device must accept the format of the EPG data provided by the EPG source. More importantly, the EPG data received by a user cannot be tailored to that user's particular tastes.

The ability to retrieve data from a single source in a particular format is not the only drawback of this arrangement. Many destination devices which receive interactive EPG data have limited storage capacity. For this reason, the EPG data downloaded from a data broker or source is typically compressed such that the destination device may store more EPG data in the limited storage space. This selective compression is primarily performed, however, by the EPG data source. This leaves the destination device with the ability to only alter the amount of EPG data downloaded as opposed to the content of the downloaded EPG data.

In addition to being unable to alter the content of the downloaded EPG data, a destination device is limited in other significant ways. EPG data from multiple EPG data providers must first be collected and consolidated by a particular EPG source before it is downloaded to a destination device. Destination devices are only capable of receiving EPG data from a single EPG data source. Because destination devices can only receive from one data provider, destination devices are limited to a single data transmission format.

Another limitation of current destination devices is that the applications on the destination device that utilize the EPG data must be updated when the EPG data source is changed or altered. Additionally, the applications on the destination device must also be updated when the format of the data source is altered or changed. EPG data is currently being transmitted by various EPG data sources across various transport mediums, but destination devices are unable to take advantage of these sources and mediums because destination devices are limited to one data provider and one format.

EPG data typically includes a title, a description and attributes such as closed captioning, rating, and the like. EPG data can be collected from in-band and out of band television signals, HTTP or FTP, TCP/IP sockets or any other communications protocol. The internet, in particular, has become a significant source of EPG data. In fact, EPG data is expanding to include reviews of programs, the names of the actors, and other types and classes of information. Much of this information is readily available, but destination devices are frequently unable to take advantage of that information because, as previously mentioned, the destination devices are limited to a particular EPG data source and a particular EPG data format.

It would be an advance in the art for a destination device to be able to receive EPG data from multiple EPG data sources and not be confined to a particular EPG data source or EPG data format. It would also be an advance in the art for a destination device to be able to tailor the content of the EPG data by permitting the EPG data to be scaled both temporally and extensibly. Scaling the EPG data in this manner provides a user, at a minimum, with EPG data that is tailored to the user.

SUMMARY OF THE INVENTION

The present invention provides EPG services which allows destination devices to overcome present limitations by enabling a destination device to receive EPG data from multiple EPG data sources or providers, including web sites and other conventional EPG data providers. In order to receive EPG data from multiple EPG data sources, a software loader module is loaded or initiated for each EPG data source. The loader module is capable of retrieving EPG data from a particular EPG data source in its native transmission format. The loadable modules interface with an EPG writer module that collects the EPG data from the loader modules and stores the retrieved EPG data locally on the destination device.

The interface or EPG writer module comprises a writer application programming interface (API) that establishes a standard access point for each loader module. This permits a single EPG writer module to interface with the loader modules of multiple EPG data sources. In this manner, a destination device can receive EPG data from multiple EPG data sources which have different transmission mediums and formats, because a loader module may be created or adapted to each separate EPG data source. The loader modules may receive EPG data in different formats, but all loader modules interface with the EPG writer.

Once the EPG data has been locally stored on the destination device by the EPG writer or the EPG writer API, an application may access the EPG data via a controller module which comprises a controller API. The controller API is an interface that allows many different applications to access the locally stored EPG data. The writer API and the controller API also allow applications to be independent of the EPG data sources. This independence allows an application to continue to have access to EPG data even if the EPG source or the format of the EPG data provided by the EPG source is changed.

EPG services also introduces significant scalability to the EPG data. Typically, the EPG data stored by EPG services is for a particular time period dictated by the supplier of the EPG data. EPG services allows this time period to be adjustable by a user or an application. For example, a device application developer or a user may choose a time period of 2 days to conserve memory on the destination device even if the EPG data source provides a 5 day block of EPG data. A device application developer or a user may also choose to alter the amount of data stored for titles, descriptions, and other program attributes. The settings selected by a developer or an end-user can be applied to a specific channel, to favorite channels, or to all channels. In other words, the EPG data stored by EPG services can be customized to a particular application or user. At a minimum, a user is provided with enhanced EPG data listings that can be tailored by the user by many factors including but not limited to content, time, and geography.

The ability to tailor the content of the EPG data using these attributes significantly enhances how a user may make use of EPG data. For example, an application developer or a user may decide to download detailed information for programs occurring in the next two days and to download less detailed information for programs occurring on days three through five. In this example, the EPG data is temporally scaled or customized by the application. In addition to being able to temporally scale or filter EPG data, EPG services allows EPG data to be scaled by several factors including, but not limited to, channel, richness, language, and time.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
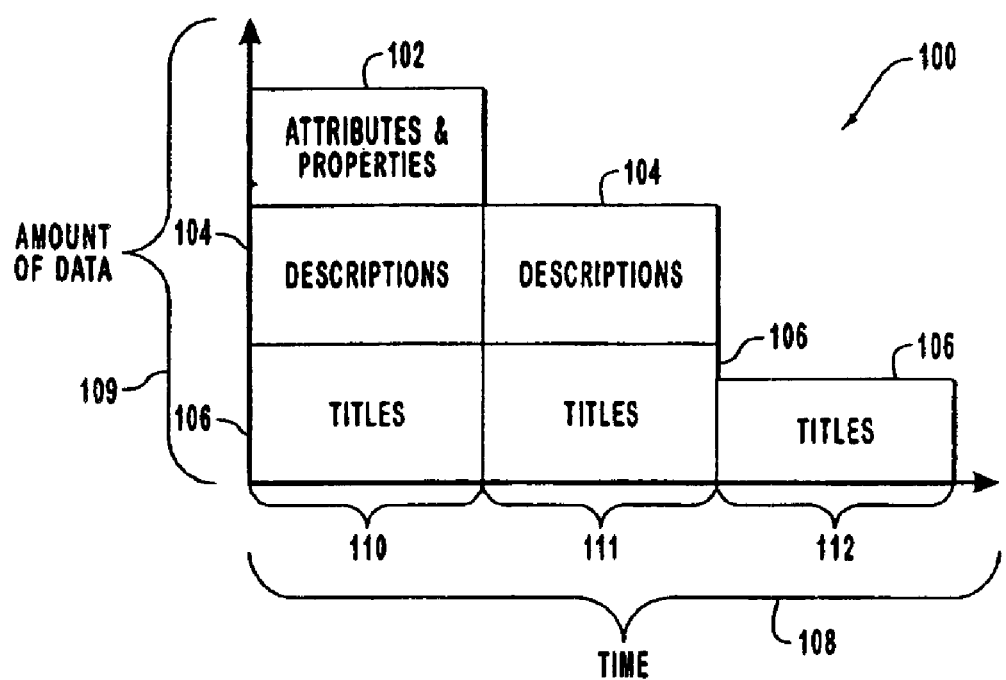
FIG. 1 is a block diagram illustrating the scalability and extensibility of EPG data which is downloaded by a destination device implementing one embodiment of the present invention.

Electronic program guides (EPGs) are used to convey data to a user. Primarily, the data typically transmitted by an EPG data source is related to television programming and may include the titles of the television programs, the descriptions of the television programs, and other attributes and properties of the television programs. The EPGs are usually developed by EPG data providers that are responsible for the content of the EPG data. For instance, EPG data provided by an EPG data provider may be devoted exclusively to movie channels or EPG data can be devoted to public or free television channels. Currently, a recipient of EPG data is restricted to the format and content of a single EPG data provider.

EPGs, however, can also be used to convey other types of information such as radio schedules, Internet streaming media event schedules, information related to the Internet, or the content of the Internet. This document focuses on EPG data relating to television programming, but other data that may be included in EPGs is within the scope of the present invention. The television programming represented by EPG data is frequently displayed in table form. Each row of the table contains a type of information such as the title of the television programs, or a description of the television program, while each column is usually represents a time period or time block. As described previously, a destination device is currently unable to alter these- characteristics and must accept the EPG data as it is formatted by an EPG data source.

EPG services overcomes the limitations of the prior art in at least two ways. Instead of simply receiving what an EPG data provider is transmitting, EPG services allows incoming EPG data to be extensibly scaled according to a several different factors or axes. For example, if the EPG data is temporally scaled, EPG services may receive detailed EPG data about television programs airing in the near future and coarse EPG data related to television programs airing further in the future.

In addition, EPG services permits a recipient of EPG data to determine the amount of descriptive EPG data such as titles, descriptions and attributes that is received. For television programs airing in the near future, the EPG data may be rich in content by including detailed descriptions while the EPG for television programs airing in the more distant future may include the titles and exclude the descriptions.

In addition to providing temporal and selective scalability, EPG services is capable or receiving EPG data from more than one EPG data source or provider. EPG services provides a loader module for each EPG data source and an abstraction layer or writer interface that interfaces with all of the loader modules. The writer interface or abstraction layer allows the EPG data received by the loader modules to be stored in the memory or storage of the destination device. Applications may then access the EPG data through another abstraction layer or control interface. The EPG data source or provider may change over time, but the application using EPG data provided by that source or provider is unaffected by those changes because the EPG data is accessed through EPG services rather than from the EPG data source or provider directly. Correspondingly, the application can be updated without regard to the EPG data provider, because the EPG data is stored via the writer interface.

The invention is described using block diagrams and flow charts. Using the block diagrams and flow charts in this manner to describe and represent the invention should not be construed as limiting the scope of the invention. Rather, the block diagrams and flow charts are intended to illustrate exemplary embodiments of the present invention.

The embodiments of the present invention may comprise a special purpose or general purpose computer comprising various computer hardware. Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EPROM, CD-ROM or other optical disk storage, magnetic disk storage or other magnetic storage devices, or any other medium which can be used to store the desired executable instructions or data structures and which can be accessed by a general purpose or special purpose computer, such as one included in a set top box. Computer-readable media may also include remote data stores such as web servers and other remote data stores. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules, being executed by one or more processors included, for example, in a set top box. Generally, program modules include routines, programs, objects, components, data structures, etc. that perform particular tasks or implement particular abstract data types. Moreover, those skilled in the art will appreciate that the invention may be practiced with other computer system configurations, including general purpose computers, personal computers, hand-held devices, multi-processor systems, microprocessor-based or programmable consumer electronics, network PCs, minicomputers, mainframe computers, and the like.

As used herein "EPG data" refers to television programming information, radio programming information, Internet content, scheduling information, titles, descriptions, movie reviews, ratings information, MPEG Streams, and any other type of data that may be retrieved from a source by an electronic device. The embodiments of the present invention described herein refer to television programming information, but the embodiments of the present invention easily extend to other types of EPG data. As used herein "digital recording" refers to copies or recordings of the data represented by the EPG data and includes but is not limited to television programnming, radio programming and the like.

Figure 2:
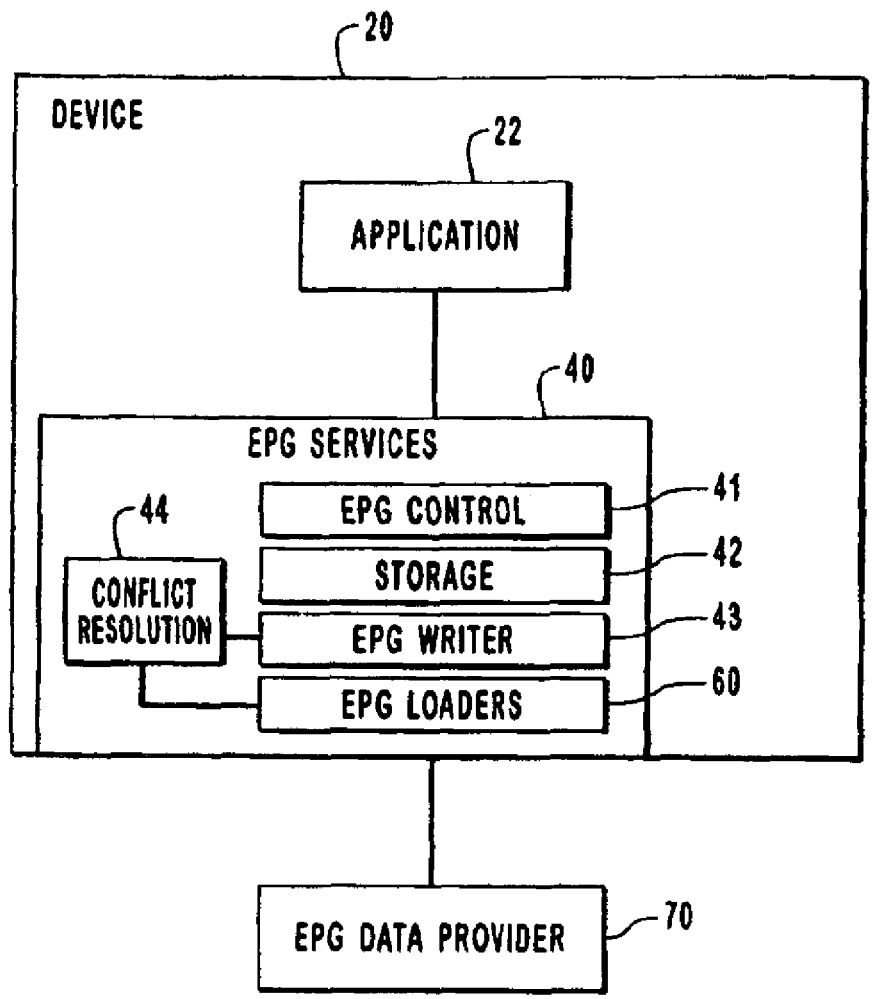
FIG. 2 illustrates an exemplary system for implementing EPG services.

FIGS. 1 and 2 illustrate generally some of the advantages provided by EPG services. The overall purpose of EPG services is to collect remote and transient EPG data and store it to provide applications with fast access, rich content, and querying capabilities for the collected EPG data. For devices having high speed network connectivity, the EPG data may also be collected and accessed remotely. EPG services achieves these objectives by: allowing the EPG data to be scaled according to many different factors or axes; providing extensibility such that new sources and types of EPG data may be accessed; providing components or modules to collect the EPG data from EPG data sources and providers; and providing components or modules to access the EPG data that has been retrieved and stored by EPG services.

FIG. 1 is a block diagram illustrating a portion of the scalability that EPG services provides for EPG data. The EPG data in FIG. 1 comprises titles 106, descriptions 104 and attributes 102. Titles 106, descriptions 104 and attributes 102 are each an example of EPG data and the combination of titles 106, descriptions 104 and attributes 102 is also an example of EPG data. EPG data may be retrieved from more than one EPG data source or provider, but the EPG data that is stored by EPG services may differ from the EPG data that was received from the EPG data source. Thus the amount of EPG data retrieved from a particular EPG that is actually stored can vary from completely excluding the EPG data to completely including the EPG data of a particular source. The EPG data illustrated in FIG. 1 is intended to be illustrative of EPG data in general and does not exclude additional information from being included in the EPG data made available by other EPG data sources and providers.

EPG data may be scaled, in this example, according to the factors or axes of time, richness, channels and language. In FIG. 1, time 108 is depicted as the horizontal axis of EPG table 100. Typically, EPG data is stored for two to seven days, but time 108 can be adjusted in one minute intervals to any desired interval. In addition, time 108 can be divided into shorter time intervals. The richness of the EPG data refers to the amount of data that is stored for television program titles, descriptions and attributes and the like. The richness of the EPG data can be varied according to title, description, and attributes as well as according to time 108. Thus, various intervals of time 108 may have varying levels of richness.

The channels is another scalable factor. In a default condition, EPG data is stored for viewable channels and no EPG data is stored for hidden or test channels. A user, however, may choose to remove a particular channel from the EPG data. In one embodiment, a removed channel is treated differently from a test or hidden channel. EPG data is still stored for removed channels, but the EPG data is not necessarily displayed to a user or an application. Another aspect of the scalability of EPG services is related to favorite or preferred channels. A channel that is designated as preferred or favorite may have EPG data that is more rich than the EPG data stored for other channels. In addition, a user has the ability to exclude certain channels or other attributes from being included in the EPG data.

The EPG data is also scalable with regard to language. This setting only applies, however, to the storage of textual data that describes a television program. The language used in the programming itself does not affect the scalability of the EPG data. The language setting only permits EPG data to be stored if the language matches the system language preferences. The described scalability factors of time, richness, channels and language are exemplary factors and do not limit the factors with which EPG data may be scaled.

EPG data table 100 in FIG. 1 further illustrates an example of EPG data that has been scaled according to richness and time. The amount of data 109 is, in this illustration, indicative of the richness of the EPG data. Column 110 contains attributes 102, descriptions 104 and titles 106. The time period for column 110 is, in this example, the next two days of EPG data. The EPG data in column 110 is rich in that descriptions 104 are extremely detailed, titles 106 are complete, and many attributes 102 are detailed. Exemplary attributes include closed captioning, rating, stereo and more.

Column 111 is indicative, in this example, of a time period from day 3 to day 5. As illustrated, the amount of data 109 is less and is coarser or less rich than the EPG data stored in column 110. Descriptions 104 in column 111 are not as detailed, but titles 106 are still complete and column 111 contains no attributes 102. Similarly, column 112 is indicative of a time period from day 6 to day 7. Only titles 106 are stored in column 112. Thus the EPG data stored in column 112 is less rich than the EPG data in column 111. EPG data table 100 therefore illustrates EPG data that has been scaled with respect to time and richness or content.

The following table is another illustration of EPG data that has been scaled according to time, richness, and channel. The EPG data displayed to a user will reflect the EPG data indicated in the following table.

| Channel Type | EPG Data | Time |
| --- | --- | --- |
| Channels Hidden by EPG Data Provider | Title | Do not store |
| | Description | Do not store |
| | Attributes | Do not store |
| Normal Channels | Title | Store 4 days |
| | Description | Store 3 days |
| | Attributes | Store 2 days |
| Favorite Channels | Title | Store 5 days |
| | Description | Store 5 days |
| | Attributes | Store 5 days |

The above table illustrates a scenario where no EPG data is stored for hidden channels, the richness of the EPG data stored for normal channels is greater for television programs airing in the near future, and the EPG data stored for favorite channels is very rich for the entire time period stored. In this manner, the EPG data can be scaled and stored in a variety of different combinations using a variety of factors. EPG services allows EPG data to be custom tailored for a particular application or user. Channels or other attributes or descriptions that are not of interest to a particular application or user may be excluded.

FIG. 2 is a block diagram illustrating an exemplary system capable of implementing one embodiment of the present invention. FIG. 2 illustrates a device 20, which may be a set top box, a computer, a video cassette recorder, a television tuner, a modem, a digital satellite tuner, or any other device capable of receiving EPG data. Device 20 receives EPG data from EPG data provider 70. Exemplary EPG data providers or sources include television stations, Internet Service Providers (ISPs), and satellites. The EPG data may be transferred via in-band television signals, out-of-band television signals, Hyper Text Transfer Protocol (HTTP), File Transfer Protocol (FTP), Transmission Control Protocol/internet Protocol (TCP/IP) sockets, or any other communication protocol.

Device 20 typically has at least one application 22 which is capable of utilizing the EPG data provided by EPG data provider 70. EPG services 40 acts as an intermediary between EPG data provider 70 and application 22. In this manner, both application 22 and EPG data provider 70 may change independent of the other without creating an incompatibility that may render application 22 incapable of receiving EPG data because EPG data provider 70 and application 22 interact with EPG services 40 rather than with each other.

One embodiment of EPG services 40 provides modules for pluggable EGP loaders 60, EPG writer 43, storage 42, and EPG control 41. EPG loaders 60 provide the ability to receive EPG data from EPG data providers. As new EPG data providers become available to device 20, a new EPG loader 60 is added to EPG services 40. The EPG loader added to the system for the new EPG data provider is capable of collecting the EPG data from the new EPG data provider. For example, an EPG loader 60 may be added to EPG services 40 which is capable of retrieving or collecting movie review data from an HTTP address. In addition, EGP loaders 60 can be added and removed from EPG services 40 as needed. When an EPG data provider 70 is no longer available, for example, the EPG loader corresponding to that EPG provider is removed from EPG services 40.

EPG writer 43 is a component or module that stores the EPG data collected by EPG loaders 60 in storage 42 which is a database containing EPG data in one embodiment. Storage 42 is also an example of a computer-readable medium. EPG writer 43 is responsible, in this example, for enforcing the scaling of the EPG data as well as the maximum amount of storage 42 that may be used for storing EPG data. Thus, if an EPG loader attempts to store EPG data that is greater in size than the maximum amount of EPG data allowed, then EPG data relating to television programming furthest in the future is removed until the EPG data being stored does not exceed the maximum storage amount allowed.

EPG writer 43 also removes EPG data from storage 42 that is no longer needed or usable. For instance, EPG writer 43 deletes the EPG data from storage 42 for all television programs which have aired before the current half-hour block. For example, at 8:15 a.m., EPG writer 43 will delete all EPG data relating to television programming occurring prior to 8:00 a.m. At 8:35 a.m., EPG writer 43 deletes television programming prior to 8:30 a.m. One reason for deleting EPG data and for limiting the amount of EPG data that can be downloaded is because storage 42 of device 20 is typically limited.

Because EPG services 40 may have a plurality of EPG loaders 60, it is possible that one or more EPG loaders 60 will attempt to add EPG data to the same record or storage locations. More simply, it is possible for a conflict to arise with respect to the EPG data in a variety of contexts. For this reason, EPG services provides various schemes for resolving conflicts. For example, multiple loaders may attempt to update the description for the same program. To resolve this conflict, the EPG writer may be implemented to treat each EPG loader with a different priority. The EPG writer may permit higher priority loaders to take precedence. Another conflict resolution alternative for EPG loaders with equal priorities is to permit the last EPG data written to take precedence and be stored in storage 42. Another alternative is to allow a user or application to select a conflict resolution scheme if conflicting EPG data sources are present. Simply stated, the user could designate a particular EPG data source or provider as having priority over another EPG data source or provider. These are examples of conflict resolution, but other methods or schemes may be employed.

It is also possible for EPG loaders 60 to implement a priority scheme independent of the EPG writer. This implementation, however, reduces the independence of the EPG loaders and forces more rigid interface and implementation constraints upon the development and design of EPG loaders. In addition, EPG loaders 60 may be time based threads that activate and deactivate at predetermined times.

The retrieval of EPG data from storage 42 is performed by a control module illustrated as EPG control 41, which is an example of a controller API in some embodiments. EPG control 41 may access: EPG data related to the available channels including channel number, channel station, network identification, station broadcast times and associated Uniform Resource Locators (URLs); EPG data related to information related to programming information including title, description, length, rating and other air times; or EPG data relating to whether the television program is purchasable, such as a pay-per-view movie or event. The EPG data can be accessed and retrieved by EPG control 41 in a variety of different combinations.

The ability to access and retrieve EPG data is enhanced by the querying capabilities supplied by EPG control. EPG data can be searched by many parameters, including but not limited to, time, title, description, category or other attribute which may be user defined. In this manner, the EPG data retrieved by an application can be extremely customized for an application. For high performance applications, EPG control 41 is also capable of notifying application 22 when the EPG data within a particular range changes. This enables applications 22 to maintain up to date EPG data available.

Figure 3:
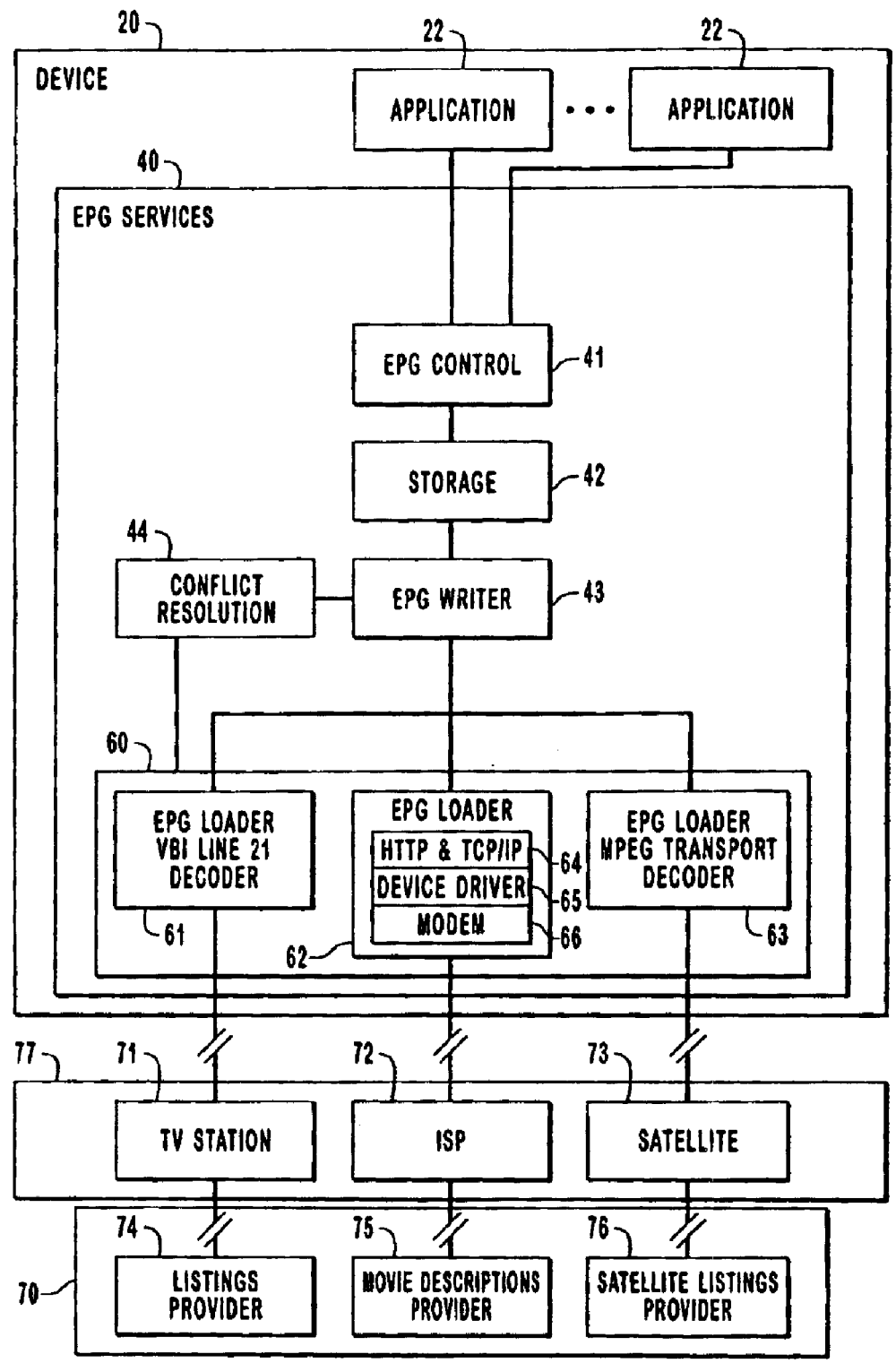
FIG. 3 is a detailed block diagram illustrating the reception of EPG data from an EPG data source and the transmission of EPG data from EPG services to one or more applications.

FIG. 3 is a detailed block diagram of a system implementing one embodiment of the present invention. Device 20 has one or more applications 22 which are capable of using EPG data. The EPG data retrieved by applications 22 may be displayed to a user via a television screen or a computer screen, or may be sent to a printer or other rendering device. EPG data is typically generated by EPG data providers 70, which are shown in FIG. 3 as listings provider 74, movie descriptions provider 75 and satellite listings provider 76. In this example, the EPG data generated by listings provider 74 is transmitted via a television station 71, the EPG data generated by movie descriptions provider 75 is transmitted via an Internet Service Provider (ISP) 72, and the EPG data generated by satellite listings provider 76 is transmitted via satellite 73. It is understood that EPG data can be transmitted in a variety of different methods and that the transmission of EPG data described herein is exemplary rather than limiting. For instance, listings provider 74 may also transmit via ISP 72.

The EPG data provided by EPG data providers 70 is received at device 20 by EPG services 40 which comprises EPG loaders 60. An EPG loader or loader module has the responsibility of collecting EPG data from its native transmission format. EPG loaders 60 comprises one or more specific EPG loaders because as illustrated by the various EPG data providers 70, EPG data can be transmitted in a variety of different methods and formats and new sources or providers of EPG data may become available in the future. For these and other reasons, each loader module collects EPG data, in this embodiment, from a particular source or provider.

FIG. 3 illustrates a Vertical Blanking Interval (VBI) loader module 61, a HTTP loader module 62 and a MPEG loader module 63. VBI loader module 61 is capable of collecting EPG data from the VBI of a television signal or broadcast. HTTP loader module 62 is capable of collecting EPG data over a network such as the Internet, and MPEG loader module 63 is capable of collecting or retrieving EPG data from a digital stream provided by satellite 73. EPG loaders 60 allow EPG data to be collected from any communication system or protocol and are not limited to those illustrated in FIG. 3.

In addition to understanding the transmission medium and format of a particular EPG data provider 70, Each EPG loader module optionally comprises the hardware and software necessary to accomplish this task. This is illustrated by HTTP loader module 62 which comprises a protocol 64, a device driver 65 and a modem 66. For HTTP loader module 62, protocol 64 may be HTTP and TCP/IP if the transmission medium is the Internet. Typically, modem 66 is the hardware required to access the Internet, but access can be accomplished with other hardware components such as a network interface cards. Device driver 65 is typically a software module designed for a particular hardware component such as modem 66.

Conflict resolution 44 is an optional pluggable component that permits a user to specify the actions to be taken when one or more EPG data providers 70 conflict. The action taken by conflict resolution 44 can be specified by the user, the application 22 or the supplier of the EPG data. For instance, the user could specify that conflict resolution 44 cause movie descriptions provider 75 to have priority over satellite listings provider 76. In this instance, the portions of the EPG data provided by satellite listings provider 76 that conflict with the EPG data provided by movie descriptions provider 75 are discarded or otherwise handled. Conflict resolution 44 is extensible and can be implemented by attribute as well as by EPG data provider. Conflict resolution 44 can also be implemented at the EPG loader level, whereby the EPG loaders resolve conflicts.

Each EPG loader 60 is capable of interacting with EPG writer 43. EPG writer 43 comprises an applications programming interface (API), in one embodiment, which is used by EPG loaders 60 to interface with EPG writer 43. The collected EPG data is placed in storage 42 by EPG writer 43. Typically, EPG loader 60 creates an instance of EPG writer 43 to perform updates to storage 42, which may be a local or remote data store. EPG writer 43 provides methods having one or more parameters that allow the EPG data collected by EPG loaders 60 to be placed in storage 42 such that the EPG data may be queried and retrieved by EPG control 41.

While EPG loaders 60 place EPG data in storage 42 via EPG writer 43, EPG control 41 performs the functions necessary to retrieve the EPG data from storage 42. EPG control 41, in one embodiment also comprises an API that provides functions and methods to application 22 that assist in the access and retrieval of EPG data. For example, it is necessary in many instances for EPG control 41 to determine if the necessary EPG data is available in storage 42. Functions and methods are also provided by EPG control 41 that are able to access and retrieve EPG data relates to channels.

In one embodiment, these methods and functions are provided by EPG writer 43 and EPG control 41 are implemented in a writer API and a controller API which are further described in U.S. patent application Ser. No. 09/527,137 entitled "Application Programming Interfaces for Electronic Program Guide Data Services," filed Mar. 16, 2000, and also in U.S. Provisional Patent Application Ser. No. 60/125062, entitled "Filtering, Scaling, and Loading of Electronic Program Data, filed Mar. 18, 1999, both of which are incorporated herein by reference.

The EPG data provided by EPG data providers 70 can also be used in digital recordings. Frequently, digital recordings are made of television programming or other types of information or programming which is described by EPG data. Storing or recording EPG data with the programming that is digitally recorded enables the stored EPG data to be queried in a manner similar to other EPG loaders. In a sense, the digital recording becomes an EPG data provider. In another embodiment, the EPG data relating to digital recordings can be stored in storage 42. In this manner, the EPG data for the digital recordings is also available to the applications through EPG control 41.

While a program is typically a unique event, programs may be repeated by a television station and may therefore correspond to one or more schedule entries. To retrieve EPG data concerning a program, EPG control 41 provides methods and functions for use with schedule entries. Programs may also belong to one or more categories or subcategories and EPG control 41 provides functions to retrieve the valid category and subcategory pairs.

Programs also may have one or more ratings which correspond to different rating authorities and EPG control 41 has functions and methods to access ratings. Some applications 22 may request notification of changes to the EPG data that may occur within a particular time range. EPG control 41 services these requests and fires an event when the EPG data changes. Typically, only one event may be requested for each instance of EPG control 41.

EPG services is intended to provide extensibility to EPG data. As illustrated, new sources of EPG data are easily accommodated by a device. The EPG data can be scaled and formatted in a variety of ways. Extensible properties can be added to the channel, program schedule entry, or weblink data and multiple properties may be added to the same set of EPG data, which enhances the ability of applications to search and utilize the stored EPG data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for receiving electronic program guide (EPG) data from one or more EPG data providers in a plurality of data formats and for providing consolidated EPG data available in a standardized format to one or more applications running on the system, comprising:
    an EPG services module for receiving EPG data from a plurality of EPG data providers and providing consolidated EPG data in a standardized format to the one or more applications residing on the system, the EPG services module comprising:
        one or more EPG loader modules with a separate EPG loader module for each EPG data source, each EPG loader module being configured to receive EPG data from an EPG data provider in a native format used by the EPG data provider and including computer executable instructions for converting the EPG data received from the EPG data provider from its native format to a standardized format compatible with the EPG services module and the one or more applications;
        an EPG writer module logically connected to each of the one or more EPG loader modules with computer executable instructions for
            collecting the EPG data in the standardized format from the one or more EPG loader modules;
            scaling the collected EPG data both temporally and selectively, wherein temporal scaling includes selecting an adjustable and user-definable time period for which the collected EPG data will be stored and wherein selective scaling includes selecting a variable and customizable level of richness for which a variable amount of the collected EPG data will be stored corresponding to one or more selected channels; and
            writing the scaled EPG data of the standardized format to a storage associated with the system; and
        an EPG control module having computer executable instructions for
            receiving requests for EPG data from the one or more applications;
            retrieving the EPG data responsive to the request from the storage; and
            returning the requested EPG data to the one or more applications; and
    an application program interface configured to provide a standardized interface between the EPG control module and the one or more applications requiring EPG data,
    such that the system can be readily modified to add additional EPG data, providers, to remove existing EPG data providers, or to accommodate changes in the native formats of existing or future EPG data providers without having to modify or update the code of any of the one or more applications.

2. A system as recited in claim 1, wherein the variable amount of collected EPG data is selectively scaled according to time.

3. A system as defined in claim 1, wherein the writer module further comprises computer executable instructions for resolving conflicts between EPG data received from two or more EPG data providers.

4. A system as defined in claim 1, wherein the one or more loader modules further comprises computer executable instructions for implementing a priority scheme.

5. A system as defined in claim 1, wherein the EPG writer module further comprises computer executable instructions for limiting the amount of the EPG data that may be placed in the storage.

6. A system as defined in claim 5, wherein the EPG writer module further comprises computer executable instructions for removing expired EPG data from the storage.

7. A system as defined in claim 6, wherein the EPG writer module further comprises computer executable instructions for keeping the last EPG data stored to a particular portion of the storage.

8. A system as defined in claim 1, wherein the storage is a database.

9. A system as defined in claim 1, wherein the one or more EPG loader modules further comprises computer executable instructions for recording EPG data with digital recordings of programming represented by the EPG data.

10. A system as defined in claim 1, wherein each of the EPG loader modules is capable of being added to the device and removed from the device.

11. A system as recited in claim 1, wherein the variable amount of the collected EPG data includes a television program title, a description and attribute of television programming.

12. A system as recited in claim 1, wherein the scaling results in the stored EPG data corresponding to more impending broadcast times being richer than EPG data corresponding to less impending broadcast lines.

* * * * *

UNITED STATES PATENT AND TRADEMARK OFFICE
CERTIFICATE OF CORRECTION

PATENT NO. : 6,904,609 B1 Page 1 of 1
APPLICATION NO. : 09/527313
DATED : June 7, 2005
INVENTOR(S) : Michael E. Pietraszak et al.

It is certified that error appears in the above-identified patent and that said Letters Patent is hereby corrected as shown below:

On the Title Page, Item (56), under "Foreign Patent Documents", line 1, delete "2/1997" and insert -- 1/1997 --, therefor.

On the Title Page, Item (57), in "Abstract", line 7, delete "data" and insert -- data. --, therefor.

In column 4, line 20, delete "these-" and insert -- these --, therefor.

In column 5, line 52, delete "programnming," and insert -- programming, --, therefor.

In column 7, line 51, delete "internet" and insert -- Internet --, therefor.

In column 11, line 65, in Claim 1, after "stored" insert -- , --.

In column 12, line 21, in Claim 1, delete "data," and insert -- data --, therefor.

In column 12, line 34, in Claim 4, delete "comprises" and insert -- comprise --, therefor.

In column 12, line 63, in Claim 12, delete "lines." and insert -- times. --, therefor.

Signed and Sealed this

Twenty-first Day of July, 2009

JOHN DOLL
*Acting Director of the United States Patent and Trademark Office*